(12) United States Patent
Ziemkowski et al.

(10) Patent No.: US 7,278,759 B2
(45) Date of Patent: Oct. 9, 2007

(54) SLAVE STROBE

(75) Inventors: Theodore B. Ziemkowski, Loveland, CO (US); Barry T. Phillips, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 11/264,062

(22) Filed: Oct. 31, 2005

(65) Prior Publication Data

US 2007/0096009 A1 May 3, 2007

(51) Int. Cl.
*F21V 21/26* (2006.01)

(52) U.S. Cl. .................. 362/269; 340/815.4; 362/205; 362/282

(58) Field of Classification Search ................ 362/205, 362/282, 276, 269, 322–323; 340/983, 815.4, 340/815.45
See application file for complete search history.

(56) References Cited

U.S. PATENT DOCUMENTS

| | | | |
|---|---|---|---|
| 4,782,432 A * | 11/1988 | Coffman | 362/184 |
| 5,535,108 A * | 7/1996 | Logsdon | 362/183 |
| 6,048,080 A * | 4/2000 | Belliveau | 362/282 |
| 6,267,478 B1 * | 7/2001 | Chen | 353/84 |
| 6,637,904 B2 * | 10/2003 | Hernandez | 362/8 |
| 2003/0076681 A1 * | 4/2003 | Rasmussen et al. | 362/280 |
| 2004/0075575 A1 * | 4/2004 | DeMarco et al. | 340/815.4 |
| 2006/0132323 A1 * | 6/2006 | Grady, Jr. | 340/815.45 |

FOREIGN PATENT DOCUMENTS

| | | |
|---|---|---|
| JP | 57 060317 | 4/1982 |
| JP | 11 212148 | 8/1999 |
| WO | WO 92/14186 | 8/1992 |

\* cited by examiner

*Primary Examiner*—Thomas M. Sember
*Assistant Examiner*—Julie A. Shallenberger
(74) *Attorney, Agent, or Firm*—Leslie F. Gehman

(57) ABSTRACT

A slave strobe is built including a photodetector, a flash tube, a flash controller, a mode switch, a body, and a top rotatable with respect to the body, and depressible with respect to the body. The photodetector is configured to detect a flash of light. The flash controller is electrically coupled with the photodetector, the mode switch and the flash tube, and is configured to change modes of operation when the mode switch is activated. The mode switch is configured to activate when the top is depressed. The top includes a plurality of strobe lenses configured to modify a flash of light from the flash tube when rotated in front of the flash tube.

16 Claims, 8 Drawing Sheets

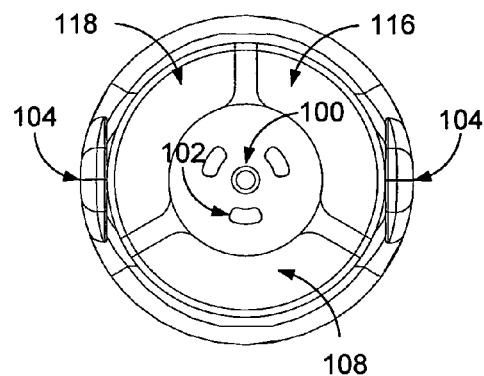
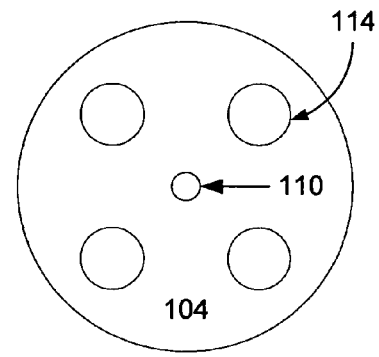
FIG. 1A   FIG. 1B
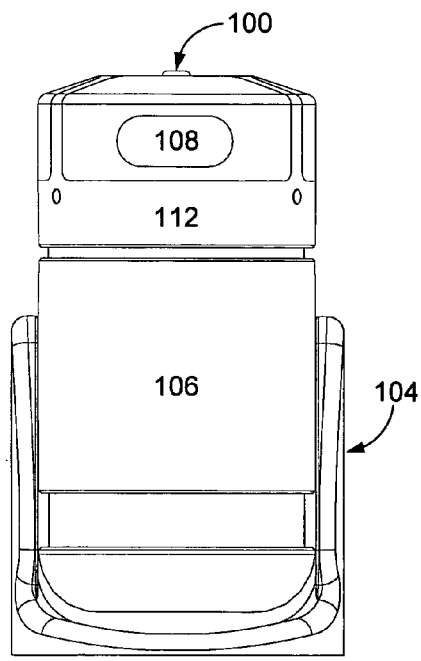
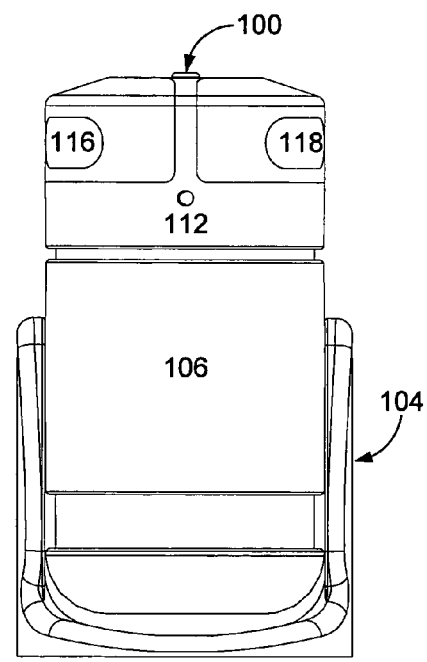
FIG. 1C   FIG. 1D

SLAVE STROBE

BACKGROUND OF THE INVENTION

There are two types of traditional slave strobes. One is hard-wired (or controlled wirelessly in some examples) to the master device (usually a camera) and fires its strobe when the master signals it to do so. In this configuration, it could be controlled to fire multiple times and could even be told to fire for a particular length of time depending on the control signals received from the master device. One disadvantage for this type of slave strobe is that the master and the slave must be designed to work together, since they both must use the same set of control signals. This limits a family of slave strobes to a particular family of master devices that use the same control signals.

The other traditional slave strobe is one that "looks" for a short pulse of light that is significantly brighter than the ambient light. These slaves fire when they detect a strobe fire from a master device or even from a secondary slave device. This type of slave strobe is very convenient as it does not require a camera with a strobe output (many of the newer pocket cameras do not include a strobe output).

Many slave strobes are limited in their ability to operate in differing power modes, delay modes, and other modes of operation. Typically, a slave strobe will have a slide switch allowing a user to change power modes, however, these switches are typically small and fragile.

Often a slave strobe will have a set angle covered by the flash, and are unable to focus a flash for distant objects. If a user desires to change the color of a slave strobe, most strobes require a filter accessory to be placed in front of the flash tube containing a color filter. Alternatively, some of these strobe filter accessories have had the ability to contain fresnel lenses, and thus change the focus of the flash. However, such accessories are cumbersome, easy to lose or forget, and susceptible to damage.

SUMMARY OF THE INVENTION

A slave strobe is built including a photodetector, a flash tube, a flash controller, a mode switch, a body, and a top rotatable with respect to the body, and depressible with respect to the body. The photodetector is configured to detect a flash of light. The flash controller is electrically coupled with the photodetector, the mode switch and the flash tube, and is configured to change modes of operation when the mode switch is activated. The mode switch is configured to activate when the top is depressed. The top includes a plurality of strobe lenses configured to modify a flash of light from the flash tube when rotated in front of the flash tube.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1A is a top view of a slave strobe according to an example embodiment of the present invention.

FIG. 1B is a bottom view of the slave strobe from FIG. 1A according to an example embodiment of the present invention.

FIG. 1C is a front view of the slave strobe from FIG. 1A according to an example embodiment of the present invention.

FIG. 1D is a rear view of the slave strobe from FIG. 1A according to an example embodiment of the present invention.

DETAILED DESCRIPTION

Figure 1E:
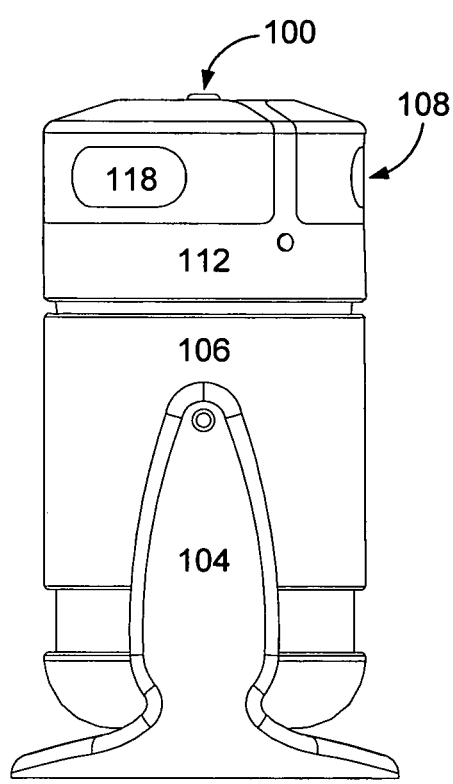
FIG. 1E is a left view of the slave strobe from FIG. 1A according to an example embodiment of the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1A is a top view of a slave strobe according to an example embodiment of the present invention. In an example embodiment of the present invention, a slave strobe is constructed including a body 106, and a top 112 rotatably coupled with the body. Within the top 112, are a photodetector 101 (such as a photodiode), below a photodetector diffuser 100 configured to measure ambient light, a pusher 102, configured to activate a mode switch 126 when the top 112 is pushed towards the body 106, and at least one strobe lens 108, 116, and 118. While this example embodiment of the present invention includes three strobe lenses 108, 116, and 118, those of skill in the art will recognize that any number of strobe lenses 108, 116, and 118 may be provided within the scope of the present invention.

In this example embodiment of the present invention a focusing lens 108 is used to focus the light of the flash tube 125, a diffusing lens 116 is used to spread the light of the flash tube 125, and a filtering lens 118 is used to filter the light of the flash tube 125. Those of skill in the art will recognize that these three examples of strobe lenses 108, 116, and 118, are not a complete set of the possible strobe lenses within the scope of the present invention. For example, special effects lenses, such as lenses that split the light from the flash tube 125 to focus the light in two or more different locations, polarizing lenses, neutral density lenses, and any imaginable lenses usable for modifying the light from the flash tube 125 may be used within the scope of the present invention. Since the top 112 is rotatable with respect to the body 106 it may be rotated to position one of the strobe lenses 108, 116, and 118 in front of the flash tube 125. This allows the user to select from the available strobe lenses 108, 116, and 118 to modify the light from the flash tube 125 and to rotate the appropriate lens in front of the flash tube 125 while the flash tube 125 remains in a fixed location with respect to the body 106. In some example embodiments of the present invention one of the strobe lenses 108, 116, and 118 may be transparent allowing the flash tube 125 to illuminate the scene with unmodified and unfiltered light.

FIG. 1B is a bottom view of the slave strobe from FIG. 1A according to an example embodiment of the present invention. The example embodiment of a slave strobe shown in these figures also includes an optional base 104 mechanically coupled to the body 106 of the slave strobe, such that the body 106 is able to tilt with respect to the base 104. This allows the light from the slave strobe to be aimed. The base in this example embodiment 104 also includes a tripod mount 114, and at least one magnet 114, both of which are optional. Those of skill in the art will recognize that some embodiments of the present invention may not require the base 104 at all, while others may use a base 104 with or without the tripod mount 110, and any number of magnets 114. If magnets 114 are included in the base 104, the slave strobe will be able to be magnetically affixed to some metal surfaces, allowing the positioning and holding of the slave strobe without the use of a tripod.

FIG. 1C is a front view of the slave strobe from FIG. 1A according to an example embodiment of the present invention. As shown in this example embodiment of the present invention, the focusing lens 108 is facing forward and is currently in front of the strobe tube 125 thus the light from the strobe tube 125 will be focused. In this view, the body 106 is in a vertical position with respect to the base 104, however it is configured to rotate forwards or backwards with respect to the base 104.

FIG. 1D is a rear view of the slave strobe from FIG. 1A according to an example embodiment of the present invention.

FIG. 1E is a left view of the slave strobe from FIG. 1A according to an example embodiment of the present invention.

Figure 1F:
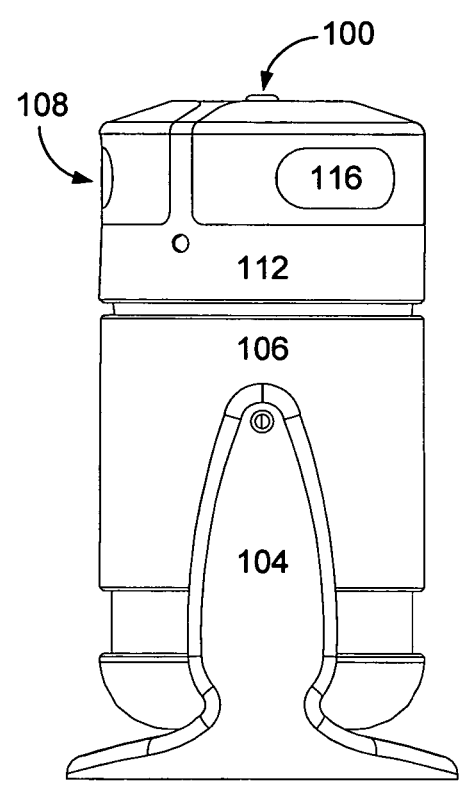
FIG. 1F is a right view of the slave strobe from FIG. 1A according to an example embodiment of the present invention.

FIG. 1F is a right view of the slave strobe from FIG. 1A according to an example embodiment of the present invention.

Figure 2A:
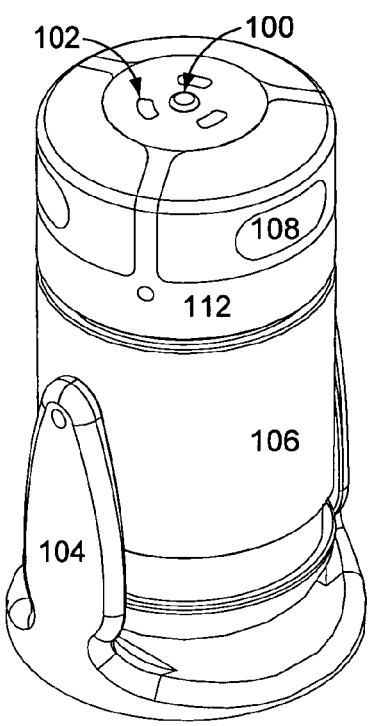
FIG. 2A is an upper left perspective view of the slave strobe from FIGS. 1A-1F according to an example embodiment of the present invention.

FIG. 2A is an upper left perspective view of the slave strobe from FIGS. 1A-1F according to an example embodiment of the present invention.

Figure 2B:
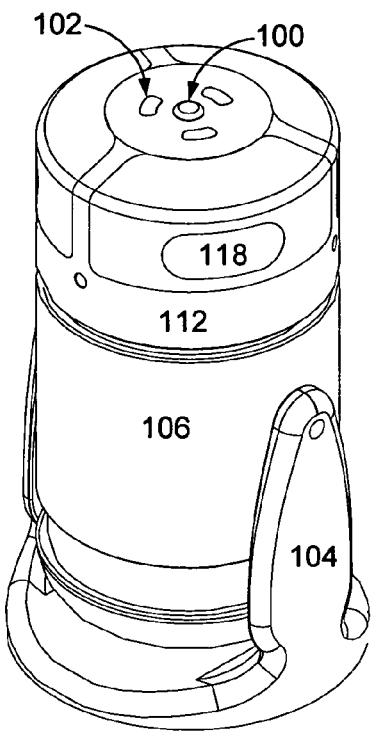
FIG. 2B is an upper right perspective view of the slave strobe from FIGS. 1A-1F according to an example embodiment of the present invention.

FIG. 2B is an upper right perspective view of the slave strobe from FIGS. 1A-1F according to an example embodiment of the present invention.

Figure 2C:
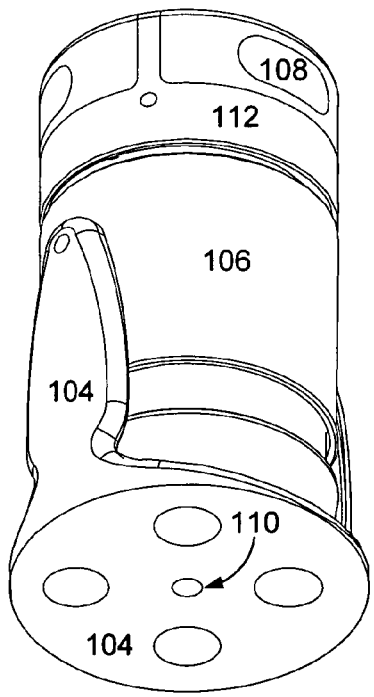
FIG. 2C is a lower left perspective view of the slave strobe from FIGS. 1A-1F according to an example embodiment of the present invention.

FIG. 2C is a lower left perspective view of the slave strobe from FIGS. 1A-1F according to an example embodiment of the present invention.

Figure 2D:
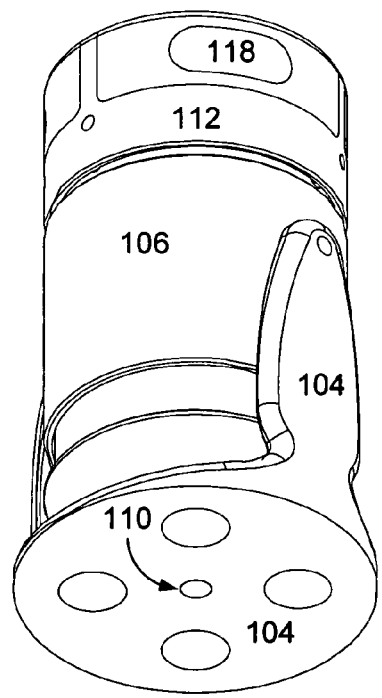
FIG. 2D is a lower right perspective view of the slave strobe from FIGS. 1A-1F according to an example embodiment of the present invention.

FIG. 2D is a lower right perspective view of the slave strobe from FIGS. 1A-1F according to an example embodiment of the present invention.

Figure 3:
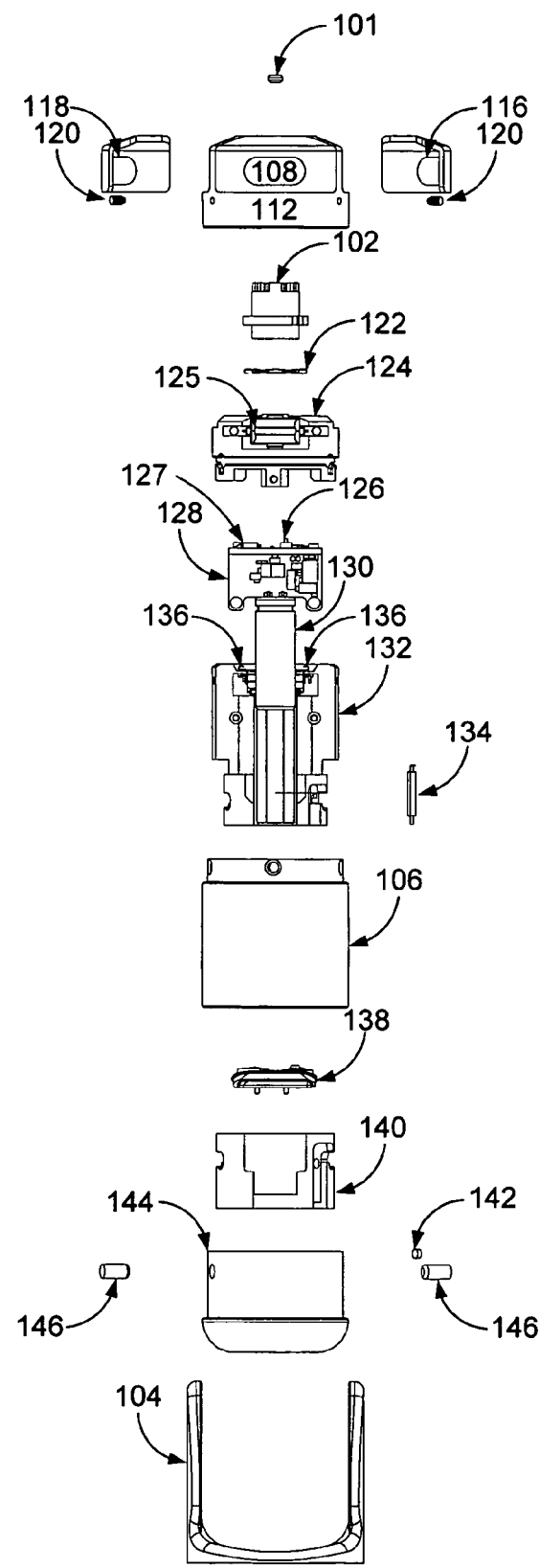
FIG. 3 is a front view exploded parts diagram of the slave strobe from FIGS. 1A-1F according to an example embodiment of the present invention.

FIG. 3 is a front view exploded parts diagram of the slave strobe from FIGS. 1A-1F according to an example embodiment of the present invention. In this example embodiment of the present invention, the strobe tube body 106 is rotatably coupled with a cap 144, where a contact positioner 140 and lower battery contacts 138 are positioned within the cap 144. The cap 144 also includes a reed switch magnet 142 configured to operate a reed switch 134 mechanically coupled with a battery holder 132. In an example embodiment of the present invention, the contact positioner 140 moves vertically within a slot in the body 106 but is prevented from rotating with the cap 144. This allows the cap 144 to rotate as it is assembled to the body 106 without the flash assembly rotating within the body 106 and the contact positioner 140 moves vertically to provide adequate contact with the batteries contained in the battery holder 132. When the cap 144 is rotated with respect to the body 106, the reed switch magnet 142 activates the reed switch 134 and turns on the slave strobe. To turn off the slave strobe, the cap 144 is rotated in the reverse direction, moving the reed switch magnet 142 away from the reed switch 134, deactivating the reed switch 134 and turning off the slave strobe. Those of skill in the art will recognize that a very wide variety of methods may be used to turn the slave strobe on and off all within the scope of the present invention. The body 106 is mechanically coupled with the base 104 by a pair of pins 146. Those of skill in the art will recognize that many different methods may be used to couple the body 106 to the base 104, such as thumbscrews, within the scope of the present invention. The fit between the body 106 and the base 104 preferably is such that the body 106 may tilt with respect to the base 104, but will hold its tilted position when released. Some embodiments of the present invention may use friction between the body 106 and the base 104 to allow the slave strobe to hold its position. The flash tube 125 is assembled with a reflector head 124, and this resulting assembly is mechanically coupled with the body 106 and electrically coupled with the flash controller 128. A mode switch 126 is electrically and mechanically coupled with the flash controller 128 along with a strobe capacitor 130. The flash controller 128 is also electrically coupled with a battery holder 132 including upper battery contacts 136. The flash controller 128, strobe capacitor 130, and battery holder 132 are all positioned within the body 106 of the slave strobe. The reflector head 124 including the flash head 125 are positioned within the top 112 of the slave strobe. A spring washer 122 is configured to exert upward pressure against the top 112, pushing it up away from the body 106. When the top 112 is pressed towards the body 106, the spring washer 122 is compressed. The pusher 102 which is mechanically coupled with the top 112 is configured so that when the top 112 is pressed towards the body 106 the pusher 102 activates the mode switch 126. This mode switch 126 which is electrically coupled with the flash controller 128 then changes a mode of the slave strobe. Those of skill in the art will recognize that a wide variety of modes may be used within the scope of the present invention. For example, the mode switch 126 may be configured to cycle through a set of slave strobe power modes, such as half-power and quarter-power. In still other embodiments, the mode switch 126 may be configured to cycle through a set of slave strobe delay times all within the scope of the present invention. A plurality of set screws 120 are used to mechanically couple the top 112 with the body 106 of the slave strobe such that the top 112 may rotate with respect to the body 106 to change which strobe lens 108, 116, and 118 is positioned in front of the flash tube 125. The top 112 is also coupled to the body 106 such that it may be depressed in order to activate the mode switch 126. Those of skill in the art will recognize that any mechanical configuration allowing the top 112 to rotate and be depressed with respect to the body 106 may be used within the scope of the present invention. This design allows a user to easily change modes of the slave strobe simply by pressing on the top 112 of the strobe. in this example embodiment of the present invention the flash controller 128 also includes at least one mode light 127 configured to shine through the transparent pusher 102 such that the pusher 102 effectively acts as a light pipe to allow the user to see the status of the mode light 127 reflecting the mode of operation of the slave strobe through the top 112 of the slave strobe. These mode lights 127 may be lit, flashing, or unlit to indicate the current mode of operation of the slave strobe. As the user cycles through the configured modes of operation by pressing the top 112 the mode lights 127 change status to visibly reflect the current mode of operation. In an embodiment of the present invention, the mode lights 127 are light emitting diodes (LEDs.)

Figure 4:
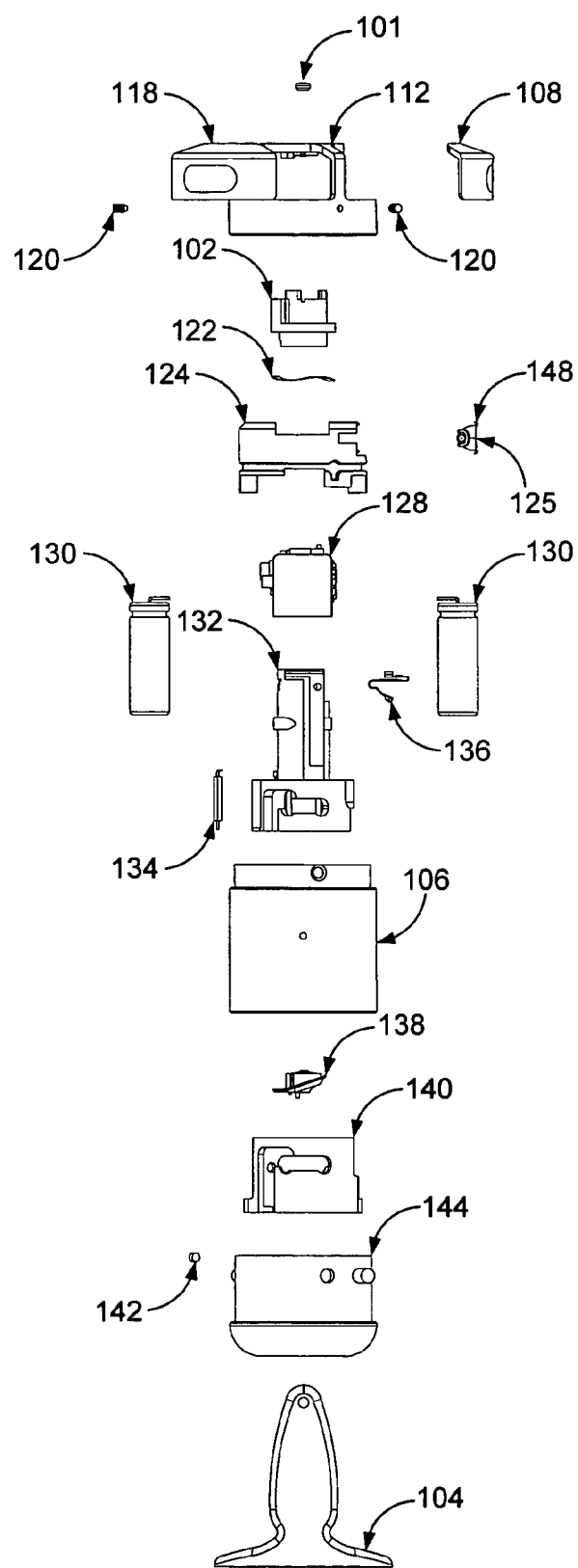
FIG. 4 is a side view exploded parts diagram of the slave strobe from FIGS. 1A-1F according to an example embodiment of the present invention.

FIG. 4 is a side view exploded parts diagram of the slave strobe from FIGS. 1A-1F according to an example embodiment of the present invention.

Figure 5:
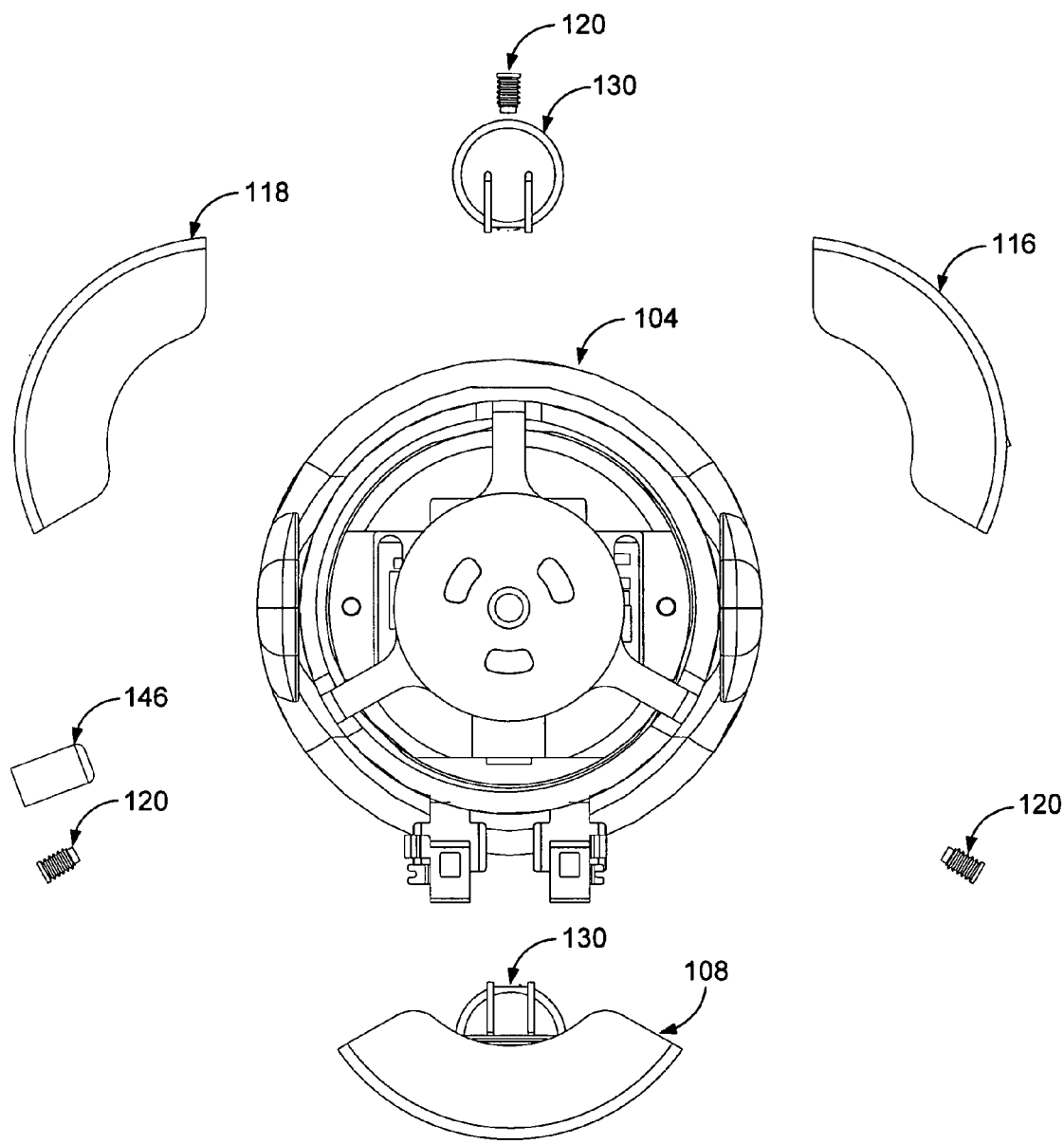
FIG. 5 is a top view exploded parts diagram of the slave strobe from FIGS. 1A-1F according to an example embodiment of the present invention.

FIG. 5 is a top view exploded parts diagram of the slave strobe from FIGS. 1A-1F according to an example embodiment of the present invention.

| PARTS LIST | |
|---|---|
| 100 | Photodetector Diffuser |
| 101 | Photodetector |
| 102 | Pusher |
| 104 | Base |
| 106 | Body |
| 108 | Focusing Lens |
| 110 | Tripod Mount |
| 112 | Top |
| 114 | Magnet |
| 116 | Diffusing Lens |
| 118 | Filtering Lens |
| 120 | Set Screws |
| 122 | Spring Washer |
| 124 | Reflector Head |
| 125 | Flash Tube |
| 126 | Mode Switch |
| 127 | Mode Lights |
| 128 | Flash Controller |
| 130 | Strobe Capacitor |
| 132 | Battery Holder |
| 134 | Reed Switch |
| 136 | Upper Battery Contacts |
| 138 | Lower Battery Contacts |
| 140 | Contact Positioner |
| 142 | Reed Switch Magnet |
| 144 | Cap |
| 146 | Pins |
| 148 | Reflector |

Figure 6A:
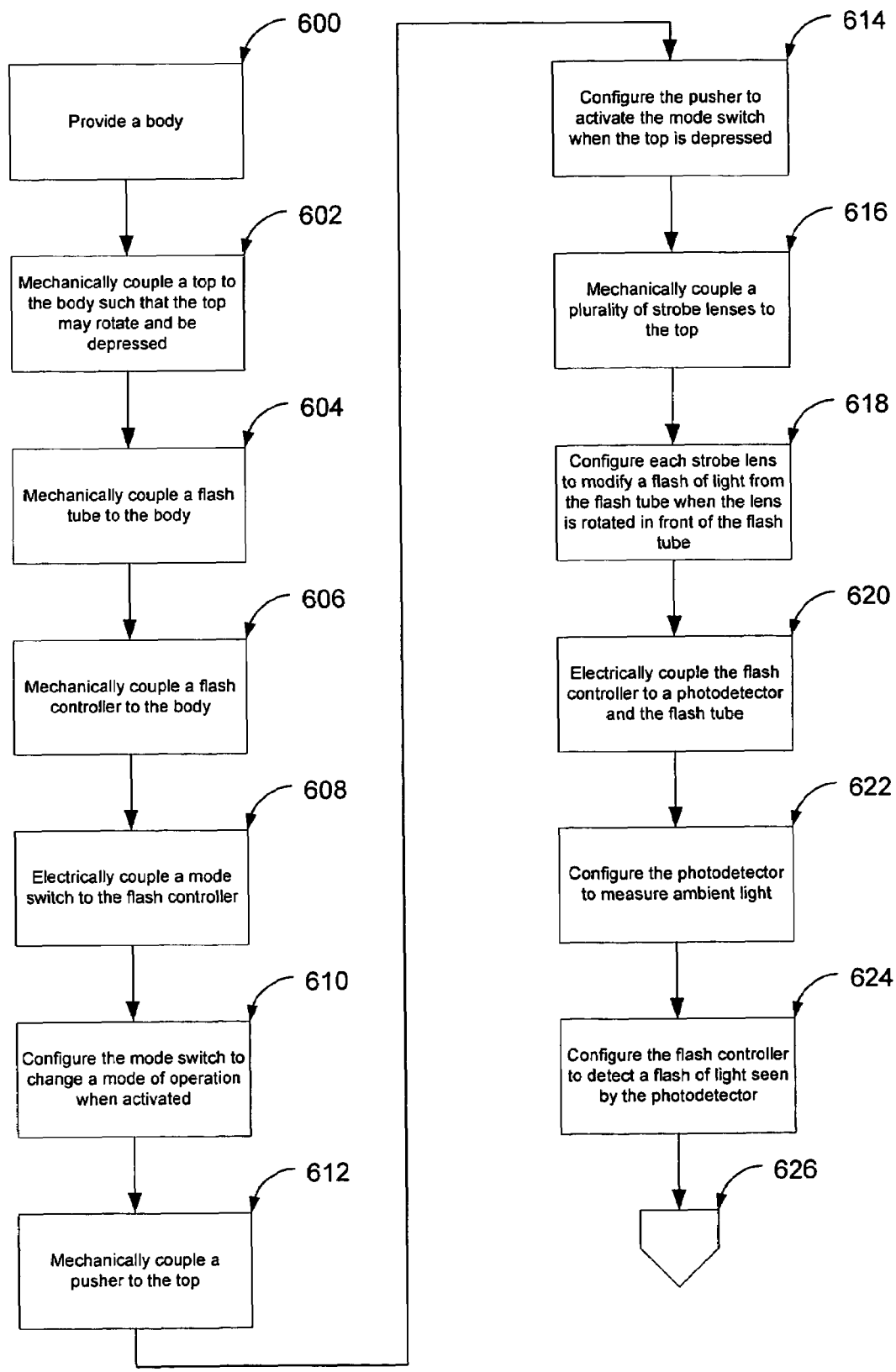
FIG. 6A is a first part of a flowchart of an example embodiment of a method of manufacturing a slave strobe according to the present invention.

FIG. 6A is a first part of a flowchart of an example embodiment of a method of manufacturing a slave strobe according to the present invention. In a step 600, a body is provided. In a step 602, a top is mechanically coupled to the body such that the top may rotate and be depressed with respect to the body. In a step 604, a flash tube is mechanically coupled to the body. In a step 606, a flash controller is mechanically coupled to the body. In a step 608, a mode switch is electrically coupled to the flash controller. In a step 610, the mode switch is configured to change a mode of operation of the slave strobe when it is activated. In a step 612, a pusher is mechanically. coupled to the top. In a step 614, the pusher is configured to activate the mode switch when the top is depressed. In a step 616, a plurality of strobe lenses are mechanically coupled to the top. In a step 618, each strobe lens is configured to modify a flash of light from the flash tube when the lens is rotated in front of the flash tube. In a step 620 the flash controller is electrically coupled to a photodetector and the flash tube. In a step 622, the photodetector is configured to measure ambient light. In a step 624, the flash controller is configured to detect a flash of light seen by the photodetector. In a conector 626, the flow chart is continued in FIG. 6B.

Figure 6B:
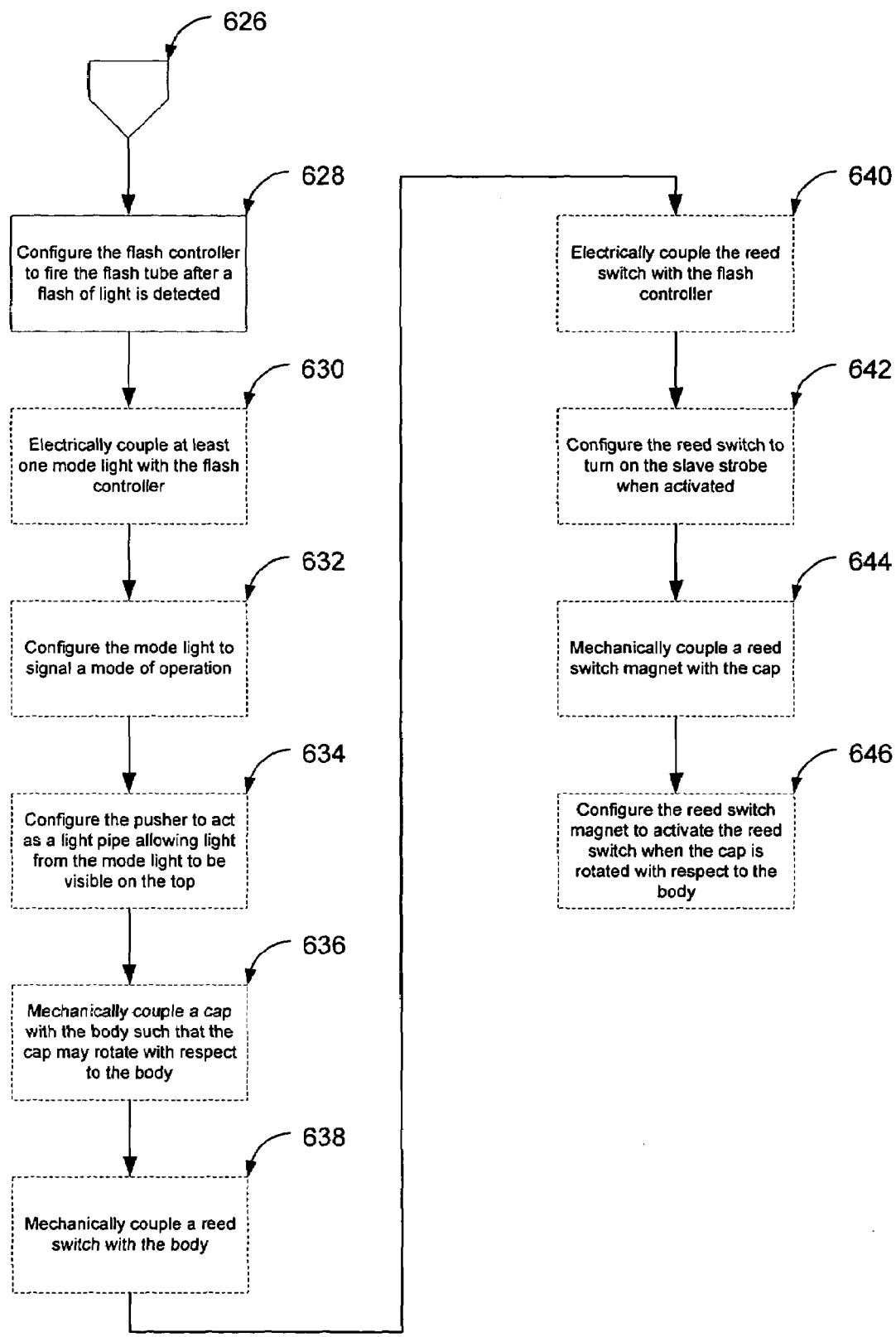
FIG. 6B is a second part of a flowchart of an example embodiment of a method of manufacturing a slave strobe according to the present invention.

FIG. 6B is a second part of a flowchart of an example embodiment of a method of manufacturing a slave strobe according to the present invention. In a connector 626, the flow chart is continued from FIG. 6A. In a step 628, the flash controller is configured to fire the flash tube after a flash of light is detected. In an optional step 630, at least one mode light is electrically coupled with the flash controller. In an optional step 632, the mode light is configured to signal a mode of operation. In an optional step 634, the pusher is configured to act as a light pipe allowing light from the mode light to be visible on the top. In an optional step 636, a cap is mechanically coupled with the body such that the cap may rotate with respect to the body. In an optional step 638, a reed switch is mechanically coupled with the body. In an optional step 640, the reed switch is electrically coupled with the flash controller. In an optional step 642, the reed switch is configured to turn on the slave strobe when it is activated. In an optional step 644, a reed switch magnet is mechanically coupled with the cap. In an optional step 646, the reed switch magnet is configured to activate the reed switch when the cap is rotated with respect to the body.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A slave strobe comprising:
   a body;
   a top mechanically coupled to said body such that said top may rotate and be depressed with respect to said body;
   a flash tube;
   a flash controller configured to control said flash tube;
   a mode switch electrically coupled with said flash controller and configured to change a mode of operation when activated;
   a pusher mechanically coupled with said top, configured to activate said mode switch when said top is depressed;

a plurality of strobe lenses mechanically coupled with said top, configured to modify a flash of light from said flash tube when rotated in front of said flash tube;

a photodetector electrically coupled with said flash controller, configured to measure ambient light, and detect a flash of light;

at least one mode light, electrically coupled with said flash controller, and configured to signal a mode of operation, and wherein said pusher is configured to act as a light pipe allowing light from said mode light to be visible on said top.

2. The slave strobe recited in claim 1, wherein one of said strobe lenses is a focusing lens.

3. The slave strobe recited in claim 1, wherein one of said strobe lenses is a filtering lens.

4. The slave strobe recited in claim 1, wherein one of said strobe lenses is a diffusing lens.

5. The slave strobe recited in claim 1, further comprising:
a base, mechanically coupled with said body, and configured to allow said body to tilt with respect to said base.

6. The slave strobe recited in claim 5, wherein said base includes a tripod mount.

7. The slave strobe recited in claim 5, wherein said base includes magnets.

8. The slave strobe recited in claim 1, further comprising:
a cap mechanically coupled with said body such that said cap may rotate with respect to said body;
a reed switch mechanically coupled with said body, and electrically coupled with said flash controller, and configured to turn on said slave strobe when activated;
a reed switch magnet mechanically coupled with said cap, configured to activate said reed switch when said cap is rotated with respect to said body.

9. A method for manufacturing a slave strobe comprising the steps of:
  a) providing a body;
  b) mechanically coupling a top to the body such that the top may rotate and be depressed with respect to the body;
  c) mechanically coupling a flash tube to the body;
  d) mechanically coupling a flash controller to the body;
  e) electrically coupling a mode switch to the flash controller;
  f) configuring the mode switch to change a mode of operation when activated;
  g) mechanically coupling a pusher to the top;
  h) configuring the pusher to activate the mode switch when the top is depressed;
  i) mechanically coupling a plurality of strobe lenses to the top;
  j) configuring each strobe lens to modify a flash of light from the flash tube when the lens is rotated in front of the flash tube;
  k) electrically coupling the flash controller to a photodetector and the flash tube;
  l) configuring the photodetector to measure ambient light;
  m) configure the flash controller to detect a flash of light seen by the photodetector;
  n) configure the flash controller to fire the flash tube after a flash of light is detected;
  o) electrically coupling at least one mode light with the flash controller;
  p) configuring the mode light to signal a mode of operation; and
  q) configuring the pusher to act as a light pipe allowing light from the mode light to be visible on the top.

10. The method for manufacturing a slave strobe recited in claim 9, wherein one of the strobe lenses is a focusing lens.

11. The method for manufacturing a slave strobe recited in claim 9, wherein one of the strobe lenses is a filtering lens.

12. The method for manufacturing a slave strobe recited in claim 9, wherein one of the strobe lenses is a diffusing lens.

13. The method for manufacturing a slave strobe recited in claim 9, further comprising the steps of:
  o) mechanically coupling a base with the body; and
  p) configuring the base to allow the body to tilt with respect to the base.

14. The method for manufacturing a slave strobe recited in claim 13, wherein the base includes a tripod mount.

15. The method for manufacturing a slave strobe recited in claim 13, wherein the base includes magnets.

16. The method for manufacturing a slave strobe recited in claim 9, further comprising the steps of:
  o) mechanically coupling a cap with the body such that the cap may rotate with respect to the body;
  p) mechanically coupling a reed switch with the body;
  q) electrically coupling the reed switch with the flash controller;
  r) configuring the reed switch to turn on the slave strobe when activated;
  s) mechanically coupling a reed switch magnet with the cap; and
  t) configuring the reed switch magnet to activate the reed switch when the cap is rotated with respect to the body.

* * * * *

UNITED STATES PATENT AND TRADEMARK OFFICE
CERTIFICATE OF CORRECTION

PATENT NO. : 7,278,759 B2
APPLICATION NO. : 11/264062
DATED : October 9, 2007
INVENTOR(S) : Theodore B. Ziemkowski et al.

It is certified that error appears in the above-identified patent and that said Letters Patent is hereby corrected as shown below:

On the title page, item (74), under "Attorney, Agent, or Firm", in column 2, line 1, delete "F." and insert -- P. --, therefor.

In column 3, line 62, delete "FIG. IF" and insert -- FIG. 1F --, therefor.

In column 5, line 28, after "In an" insert -- example --.

Signed and Sealed this

Twenty-fourth Day of June, 2008

JON W. DUDAS
*Director of the United States Patent and Trademark Office*